June 21, 1927.
H. BROWN
1,633,393
MEANS FOR MEASURING RESPIRED AIR IN TESTING THE LUNGS
Filed Jan. 31. 1924  2 Sheets-Sheet 1
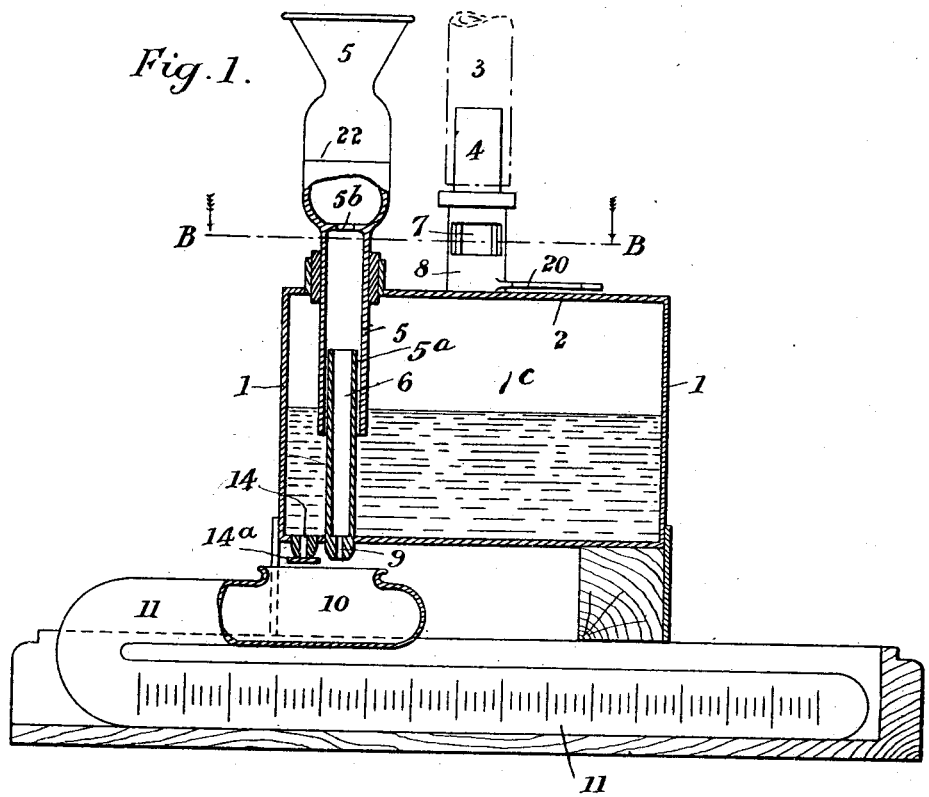

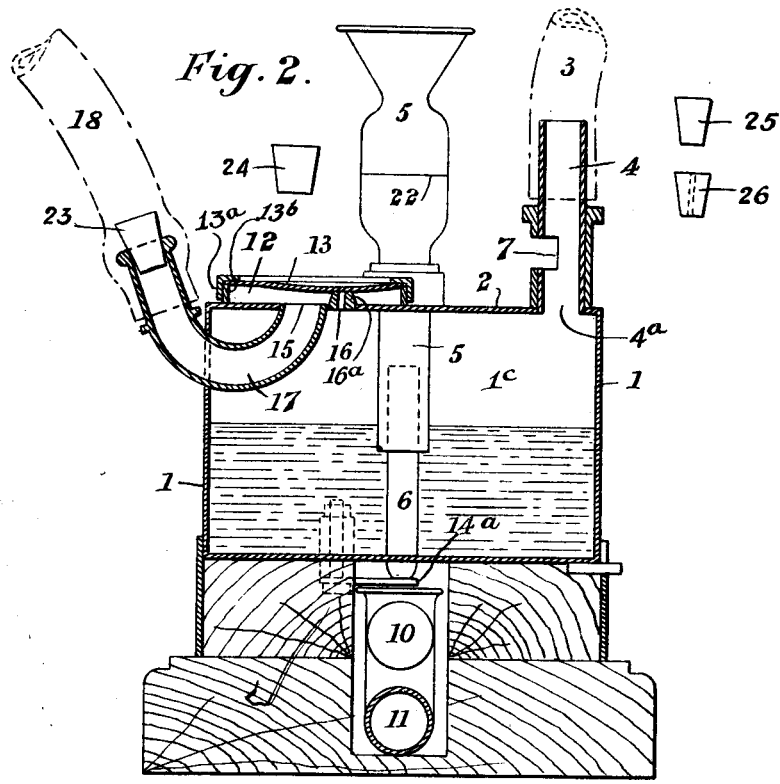

Patented June 21, 1927.

1,633,393

UNITED STATES PATENT OFFICE.

HAYDN BROWN, OF LONDON, ENGLAND.

MEANS FOR MEASURING RESPIRED AIR IN TESTING THE LUNGS.

Application filed January 31, 1924, Serial No. 689,762, and in Great Britain February 2, 1923.

My invention has for its principal object to provide improved means whereby the condition of the lungs and their action in breathing can be very conveniently and accurately ascertained both as regards their capacity and their normal action in breathing and also as to their condition as regards maximum respiratory powers.

According to my invention I utilize displacement of water, or other suitable liquid, from the lower part of a receptacle into an observable part of the apparatus in such a way that the user can see that he is maintaining a steady action whilst the expulsion of liquid into a measuring tube or vessel, (in which such expelled liquid is retained) is employed to show the capacity, or condition, of the lungs of the user who has breathed into the upper part of the receptacle above the liquid therein.

I will describe with reference to the accompanying drawing constructions in accordance with my invention from which its nature and how it may be performed will be understood. Figures 1 and 2 are vertical sections at right angles to each other, the section Figure 1 being taken on the line A, A Figure 3 and the section Figure 2 being taken on the line C, C, Figure 3. Figure 3 is a plan partly in section on the line B, B, Figure 1.

Referring to the drawings, the receptacle 1 is capable of being closed air-tightly by the cover 2 so that there is, when the said receptacle is partly filled with water, a space 1ᶜ above the water and between it and the inside of the said cover. An opening 4ᵃ communicates with this space through which opening air is respired, for instance, by means of a flexible pipe 3 connected with the said opening by means of a short rigid pipe 4. Through the cover 2 I pass the lower part of a transparent tube 5 which projects downwards into the water in the receptacle 1, and outwards to a sufficient extent for observation, it being open at the top. The lower part of the said tube 5 passes over an internal tube 6 which rises from the bottom of the receptacle 1, and, at top, communicates with the interior of the tube 5, there being a space 5ᵃ between the tubes 5 and 6, the said tube 5 preferably having an enlarged top, as shown, and a contracted opening 5ᵇ in it above the top of the tube 6. The constriction prevents the too rapid rise and fall of liquid in the tube 5. In the cover 2, or other convenient part above the level of the liquid in the receptacle 1, there may be (for a purpose hereinafter explained) a slot, or opening, by which any required proportion of the air passed into the said space can be allowed to escape, the proportion being regulated by a valve, or shutter. The said slot, or opening is illustrated at 7 as being in the tube 4 and the valve or shutter, as being a slotted sleeve 8 which can be moved through part of a revolution around the tube 4. When the parts are arranged as above described for measuring inspiration and expiration the tube 17 is closed by a plug 23, as shown in Fig. 2. As will be described later, a perforated plug 26 is sometimes used in the tube 4 at the same time that the plug 23 is in place.

When air is passed into the aforesaid space 1ᶜ above the water in the receptacle 1, water will pass up through the space 5ᵃ between the tubes 5 and 6, down through the tube 6 and out through the hole 9 at the bottom of the said tube 6 which passes through the bottom of the receptacle 1. The said portion of water is received in a cup, or the like, 10, in connection with a measuring tube 11, and thus I can measure the capacity of the lungs by the amount of water passing out of the escape hole 9 in a measured period of time. The escape hole 9 is made relatively small; for example, in apparatus used for the average person it may be, one to two millimeters in diameter. Consequently, if the user blow hard enough, all the displaced water will not be able to flow out through the hole 9 immediately and a portion of it will rise up the tube 6 and the tube 5 into the transparent part of the tube 5 where its height can be observed. The user, can, by maintaining an even pressure, cause the water to remain at any predetermined level, which may be indicated by a mark as at 22 and the time during which the water will remain at the given level, will depend upon the time the user can expire air at a steady given pressure. When the user ceases to expire air, the displaced water still in the tube 5 will flow out through the hole 9. If desired, some of the air respired may be allowed to escape without acting to force up the water, by opening the aforesaid valve, or shutter 8, the proportion of air escaping varying with the extent to which it is opened.

In order to measure what is termed tidal breathing (that is not full inspiration and expiration, but the amount of air respired in ordinary breathing) I apply to the cover 2 a receptacle 12 covered by a flexible diaphragm 13 which leaves a space between itself and the said cover 2 the receptacle 1 having in it a closable hole 14 at the bottom, for the outlet of water into the cup 10 and measuring device 11. Communicating with the interior of the receptacle 12 are holes 15 and 16 forming respectively large and small communications between the space under the diaphragm 13 the opening 15 being provided with a tube 17 and mouthpiece (not shown) on a flexible pipe 18 for respired air to and from the said receptacle 12. The hole 16 is in an upstanding nipple piece 16ª. The flexible diaphragm 13 is secured over the holes 15 and 16 by a ring 13ª and a ledge 13ᵇ so that the only communications with the space beneath the said diaphragm 13 are through the said holes. The flexible tube 3 is removed, and the opening at the top of tube 4 is stopped by inserting a rubber cork or any other suitable plug 25 and the shutter 8 is turned to close the slot 7. The tube 5 is removed and is replaced by a plug 24 to close the opening in the cover 2 and the shutter 14ª is moved to open the hole 14 and close the hole 9. The diaphragm 13, when it is drawn down on suction due to inspiration, closes the hole 16, whilst, on expiration, the said diaphragm rises sufficiently to allow expired air to pass down into the receptacle 1 and force out through the opening 14 an amount of liquid in accordance with the number of respirations and their force. The hole 14 for the outlet of water from the receptacle 1 is closed by the shutter 14ª and the inlet for air through the pipe 17 is also closed when the device is not in use for measuring tidal breathing.

When it is desired to use the first described device to measure the force of expiration I can limit the amount of expired air passed through the pipe 4 into the receptacle 1, which may be done by inserting a plug 26, with a small hole in it, into the tube 4 through which air is respired and, in operation, whilst the user is respiring air, I can regulate the opening 7 by which some expired air can escape without entering the water receptacle beneath, and from the degree of opening attained when water is observed to rise in the transparent tube 5 I can ascertain the force of expiration. A convenient means for effecting this is to make the aforesaid escape slot, or opening 7, in the form of an arc of a circle and its valve, or shutter, 8 as a sleeve as hereinbefore described and to provide the valve, or shutter, 8 with a pointer 20 which can be used as the means of operating the valve, or shutter, 8 and as the indicator for a scale 21 marked in a semicircle or arc, on the cover 2 of the receptacle 1. When air is blown, or expired, forcibly into the receptacle 1 above the water therein, some air escapes and some air passes into the said receptacle in proportion to the degree of opening of the arc-shaped escape slot, or opening 7 and the force exerted by the lungs can be readily ascertained by watching the water in the transparent tube 5 and noting on a scale, the point at which the water is observed to rise beyond the normal level in the said tube.

Although I have described the devices as being employed for testing the lungs, they can also be employed for any analogous purposes to which they may be applicable, and it will be understood that the device described for testing the capacity, or power, of the lungs and the device described for testing tidal breathing can be used separately, or be combined in one apparatus as illustrated.

What I claim is:

1. A device for testing the lungs, comprising a vessel adapted to contain liquid, and tubular means associated with said vessel whereby expired air is passed into the vessel above the liquid, in combination with a volumetric measuring element and tube means within said vessel having a relatively small aperture and leading from the liquid in the vessel to said measuring element, said tube means being arranged with a visible portion above the closed vessel so that the variations in pressure on the liquid can be observed by watching the level of the liquid in the visible portion of the tube means.

2. A device for testing the lungs, comprising an air tight vessel having therein, at its upper part, a hole and a passage connected therewith for respired air, water in said vessel, and a transparent tube open at both ends, passing through the upper part of said vessel and descending into the water, in combination with a second tube rising some distance into the first tube from the bottom of the vessel, the top and bottom parts of the receptacle being provided with openings through which said tubes may extend, and there being a space between the two tubes.

3. A device according to claim 1 in which the means whereby expired air is passed into the vessel includes a tube having an opening therein adapted to provide inlet for air from the atmosphere, said tube communicating with the space in the upper part of the vessel, and means adapted to regulate the effective area of said opening, substantially as described.

In testimony whereof I have signed my name to this specification.

HAYDN BROWN.